United States Patent
Shaw et al.

(10) Patent No.: US 7,694,093 B2
(45) Date of Patent: Apr. 6, 2010

(54) MEMORY MODULE AND METHOD FOR MIRRORING DATA BY RANK

(75) Inventors: Mark Shaw, Plano, TX (US); Christian Petersen, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 431 days.

(21) Appl. No.: 11/741,487

(22) Filed: Apr. 27, 2007

(65) Prior Publication Data

US 2008/0270717 A1    Oct. 30, 2008

(51) Int. Cl.
*G06F 12/00* (2006.01)

(52) U.S. Cl. .................... 711/162; 711/5; 711/105; 711/154; 711/159; 711/168

(58) Field of Classification Search .............. 711/5, 711/105, 154, 159, 161–162, 167–169, E12.069; 707/204; 714/6
See application file for complete search history.

(56) References Cited

U.S. PATENT DOCUMENTS

| | | | |
|---|---|---|---|
| 5,278,847 A | 1/1994 | Helbig, Sr. et al. | |
| 5,406,565 A | 4/1995 | MacDonald | |
| 6,081,463 A | 6/2000 | Shaffer et al. | |
| 6,163,490 A | 12/2000 | Shaffer et al. | |
| 6,260,156 B1 | 7/2001 | Garvin et al. | |
| 7,009,896 B2 | 3/2006 | Yoon et al. | |
| 7,130,229 B2 * | 10/2006 | Dahlen et al. | 365/200 |
| 7,142,471 B2 | 11/2006 | Fasoli et al. | |
| 2001/0039601 A1 | 11/2001 | Leung et al. | |
| 2004/0196707 A1 | 10/2004 | Yoon et al. | |
| 2005/0132128 A1 | 6/2005 | Lee | |
| 2006/0018166 A1 | 1/2006 | Iaculo et al. | |
| 2006/0109725 A1 | 5/2006 | Yoon et al. | |
| 2006/0221728 A1 | 10/2006 | Fasoli et al. | |

OTHER PUBLICATIONS

Craig Szydlowski; Tips for Using RAS Features for Storage Systems; Computerworld Storage; Aug. 11, 2005; 3 pages; http://www.computerworld.com/hardwaretopics/storage/story/0,10801,103821,00.html.

* cited by examiner

*Primary Examiner*—Jasmine Song

(57) ABSTRACT

A memory module including first and second ranks is provided. Each rank includes a separate plurality of individually accessible memory locations. Also included in the memory module is a control circuit coupled with the first rank and the second rank. The control circuit is configured to receive a write command for writing data to the first rank, and to process the write command to write the data to both the first rank and the second rank. Another embodiment of the invention features the control circuit alone.

14 Claims, 7 Drawing Sheets

700

MEMORY MODULE AND METHOD FOR MIRRORING DATA BY RANK

BACKGROUND OF THE INVENTION

A vital component of virtually all computer systems is a semiconductor or solid-state memory system. Such memory often holds both the programming instructions for a processor of the computer system, as well as the data upon which those instructions are executed. In one example, the memory system may include one or more dual in-line memory modules (DIMMs), with each DIMM carrying multiple dynamic random access memory (DRAM) integrated circuits (ICs). In addition, one or more processors may be coupled with the memory modules through a memory controller, which translates data requests from the processor into accesses to the data held in the memory modules.

Computer systems have benefited from the ongoing advances made in both the speed and capacity of memory devices, such as DRAMs, employed in memory systems today. However, increasing memory data error rates often accompany these advancements. More specifically, both "hard errors" (permanent defects in a memory device, such as one or more defective memory cells) and "soft errors" (data errors of a temporary nature, such as inversion of data held within one or more memory cells) tend to become more prevalent with each new technology generation.

To combat these errors, memory controllers in commercial computer systems often support an error detection and correction (EDC) scheme in which redundant EDC data is stored along with the customer, or "payload," data. When these data are then read from the memory, the memory controller processes the EDC data and the payload data in an effort to detect and correct at least one data error in the data. The number of errors that may be detected or corrected depends in part on the nature of the EDC scheme utilized, as well as the amount of EDC data employed compared to the amount of payload data being protected. Typically, the more EDC data being utilized, the higher the number of errors being detected and corrected, but also the higher the amount of memory capacity overhead incurred.

Due to the extra cost involved, some memory systems do not employ an error detection or correction capability. Further, in spite of the use of an EDC scheme, the error rates of the memory devices may overwhelm the capability of the memory system to detect and correct the errors. To address these errors, some memory systems may provide a spare DIMM to be used as a data "mirror" to store a second copy of data to protect the system against the failure of an in-use DIMM. However, similar to the use of EDC, the employment of one or more spare DIMMs also increases the cost and memory overhead associated with the memory system. In addition, memory systems employing a DIMM as a data mirror for an in-use DIMM typically are configured such that the memory controller must write the same data to both an in-use DIMM and a mirror DIMM as two separate write operations, thus essentially reducing the memory system bandwidth by half.

DETAILED DESCRIPTION OF THE INVENTION

Figure 1:
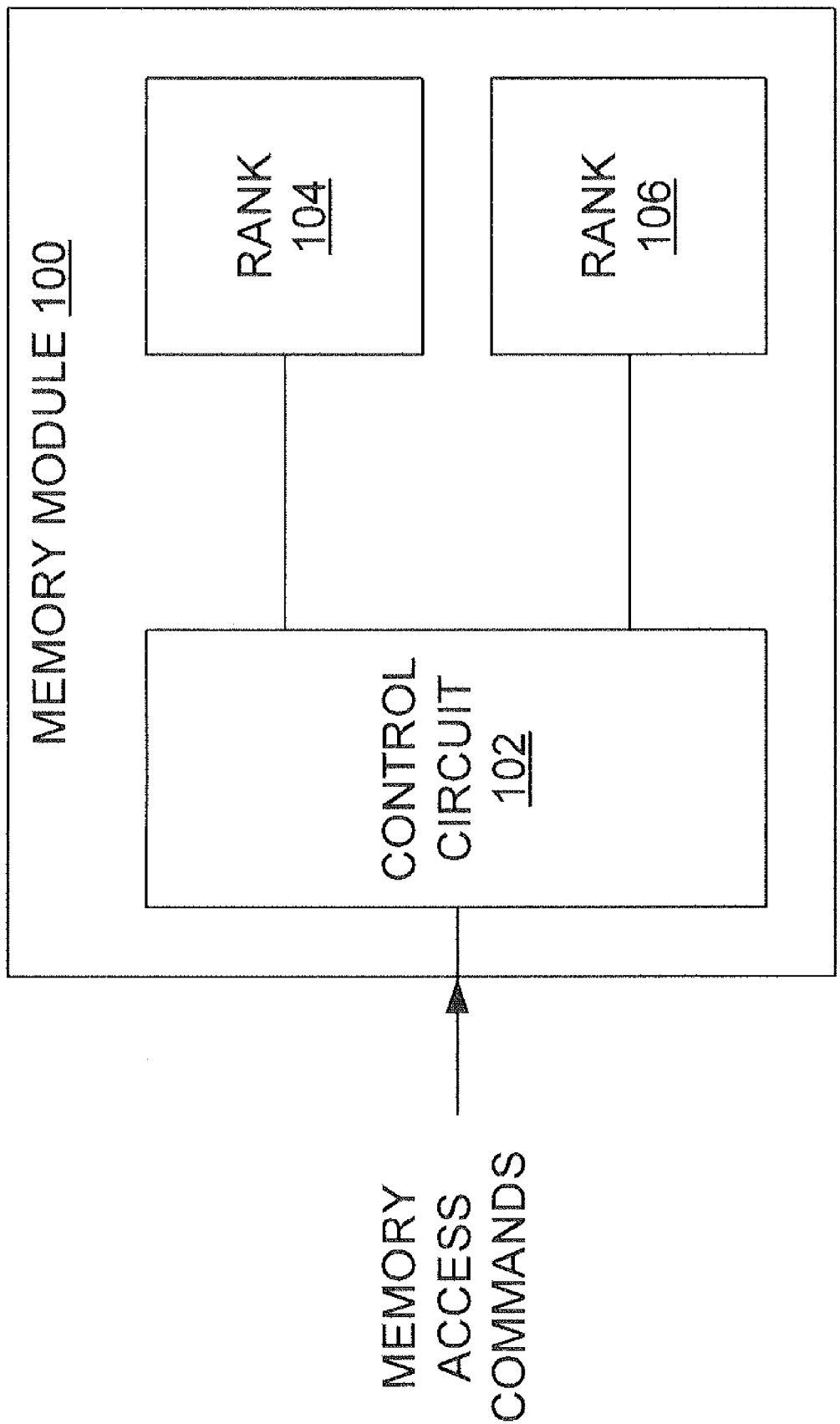
FIG. 1 is a block diagram of memory module according to an embodiment of the invention.

FIG. 1 provides a block diagram of one embodiment of the invention: a memory module 100 including a control circuit 102 coupled with a first rank 104 and a second rank 106, wherein each of the ranks 104, 106 includes a separate plurality of individually accessible memory locations. The control circuit 102 is configured to receive a write command for writing data to the first rank 104, and to process the write command to write the data to both the first rank 104 and the second rank 106. The control circuit 102 alone represents another embodiment.

Figure 2:
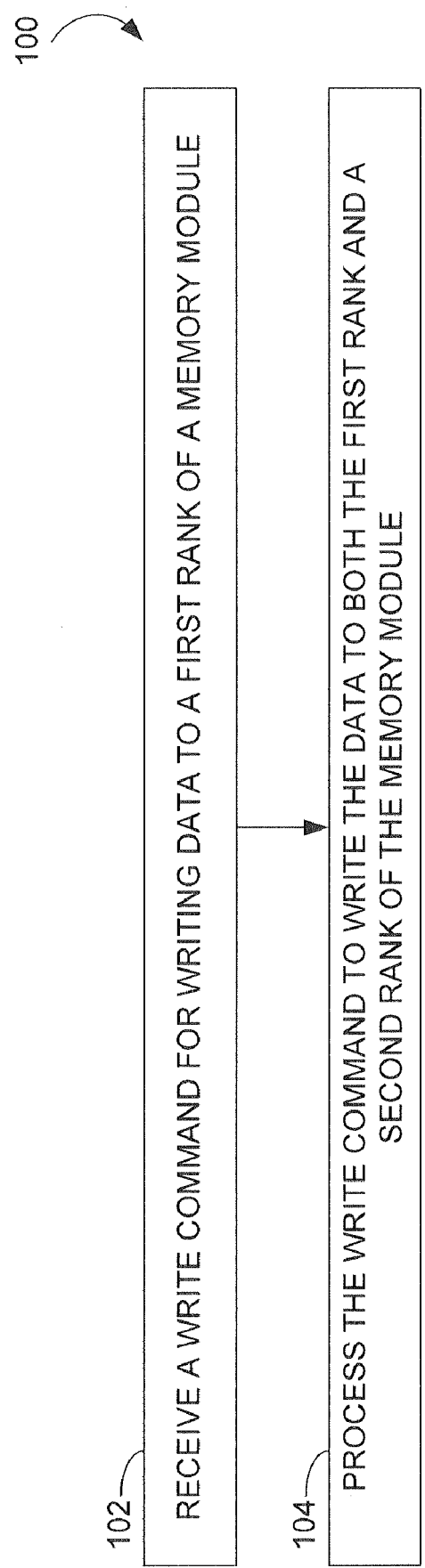
FIG. 2 is flow diagram of a method for mirroring data by rank according to an embodiment of the invention.

Yet another embodiment of the invention, a method 200 for mirroring data by rank, is illustrated in the flow diagram in FIG. 2. In the method 200, a write command for writing data to a first rank of a memory module is received (operation 202). The write command is processed to write the data to both the first rank and a second rank of the memory module (operation 204).

Figure 3:
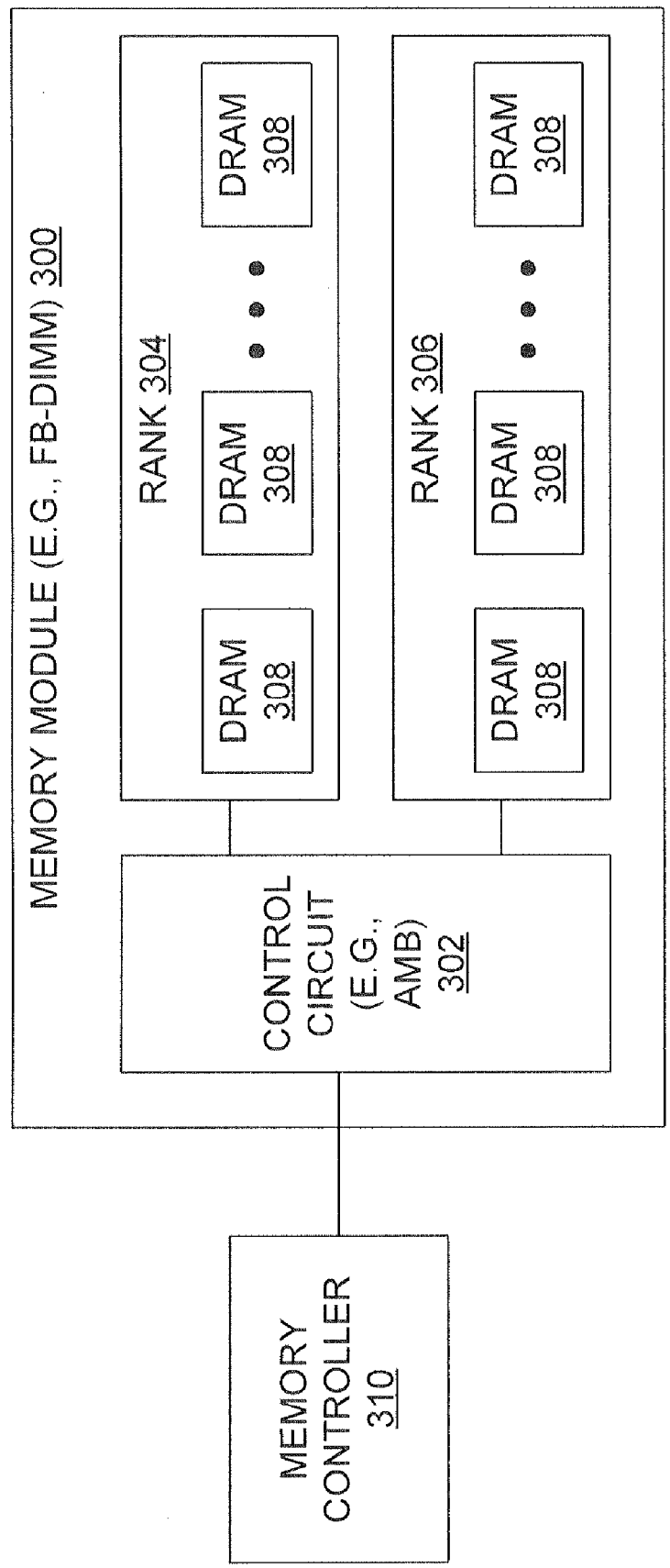
FIG. 3 is a block diagram of a memory module employing two memory ranks according to an embodiment of the invention.

FIG. 3 depicts another embodiment of a memory module 300 including a control circuit 302 coupled with a first memory rank 304 and a second memory rank 306. In one embodiment, the memory module 300 is configured as a two-rank DIMM, although other configurations, such as a single in-line memory module (SIMM) organization, are also possible. Generally, a rank includes one or more separate memory devices or integrated circuits (ICs) that may be accessed simultaneously as a group, wherein each addressable location of each separate device provides a number of the data bits for a particular memory location. For example, presuming each memory location holds 72 bits, each rank may comprise nine 8-bit-wide DRAMs, or eighteen 4-bit-wide DRAMs, with each DRAM contributing a number of data bits to each addressable memory location. The number of possible addressable locations in the rank is defined by the number of addressable locations of each of the DRAMs.

Typically, all the memory devices within a rank 304, 306 are accessed simultaneously so that each addressable memory location of the rank 304, 306 provides all of the data for the accessed memory location. As a result, each of the address and control signal lines for each device of a rank 304, 306 are coupled together so that they may be driven simultaneously. Also, each separate rank 304, 306 may be activated independently so that the activation time of the ranks 304, 306 (i.e., the latency required to begin reading data from, or writing data to, a rank) may be at least partially overlapped to increase memory access bandwidth.

In the specific example of FIG. 3, each rank 304, 306 includes a plurality of DRAMs 308, as described above. In other embodiments, static random access memory (SRAM) devices, or devices using other memory technologies, may be utilized. Each of the ranks 304, 306 is coupled to a control circuit 302, shown as located within the memory module 300. In one particular implementation, the memory module 300 is a fully-buffered DIMM (FB-DIMM), with the control circuit 302 being an advanced memory buffer (AMB). In that case, the control circuit 302 receives memory access commands over a serial interface from a memory controller 310 to access the ranks 304, 306 of the memory module 300. Other types of memory modules, such as more standard DIMMs and SIMMs employing a parallel memory interface between the memory module 300 and the memory controller 310, may be used in other embodiments. In another embodiment, the memory module may include two or more physical modules, such as DIMMs or SIMMs, coupled to the same memory bus, with each physical module including one or more memory ranks. As a result, one rank in one physical module may mirror a rank of another physical module of the same memory module. In further implementations, the control circuit 302 may be located separately from the memory module 300, possibly incorporated within the memory controller 310.

The control circuit 302 is configured to receive memory write and read commands from the memory controller 310 and process those commands to employ the second rank 306 as a data mirror for the first rank 304. Using one rank as a data mirror for another in a two-rank memory module results in half the memory capacity yield, but also provides the benefit of maintaining a copy of all data in the first rank 304, thus greatly reducing the number of uncorrectable data errors encountered.

Figure 4:
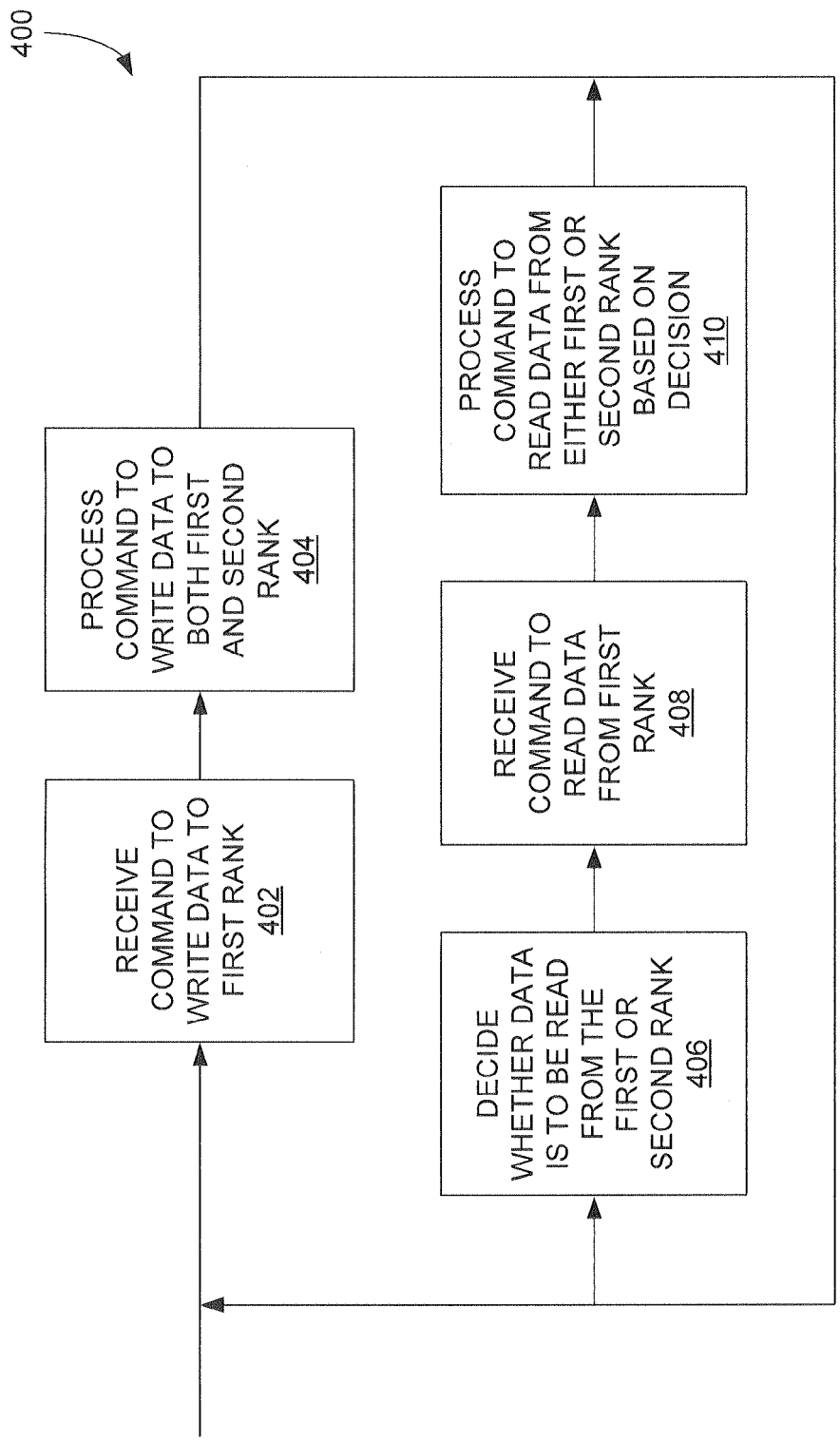
FIG. 4 is a flow diagram of a method for mirroring data in the memory module of FIG. 3 according to an embodiment of the invention.

FIG. 4 presents a simplified flow diagram of a method 400 for operating the memory module 300 in which the second rank 306 is a data mirror for the first rank 304. As with all of the methods described herein, while FIG. 4 displays one particular order for the operations depicted therein, other orders of execution are possible while still retaining the necessary functionality for the various embodiments.

In the method 400, when the control circuit 302 receives a write command from the memory controller 310 to write data to the first rank 304 (operation 402), the control circuit 302 processes the write command to write the data to both the first rank 304 and the second rank 306 (operation 404). In one embodiment, the data is written to the ranks 304, 306 simultaneously, thus eliminating any extra memory bandwidth normally associated with data mirroring.

When data is being read from the memory module 300, a decision is made as to whether the data should be read from the original first rank 304 or the mirroring second rank 306 (operation 406). In one embodiment, the memory controller 310 determines whether data is to be read from the first rank 304 or the second rank 306. For example, the memory controller 310 may employ simple error detection or an error detection and correction scheme when reading data from the first rank 304 to decide whether subsequent data should continue to be read from the first rank 304 or from the second rank 306. The memory controller 310 may then indicate by way of a signal to the control circuit 302 which rank 304, 306 should be read. In another implementation, another portion of the electronic system in which the memory module 300 resides may make this determination and indicate the rank 304, 306 to be read to the control circuit 302. In yet another embodiment, the control circuit 302 may determine itself without input from the memory controller 310 which rank 304, 306 should be read. The control circuit 302 may make such a determination by way of error detection circuitry or other means.

In one implementation, the determination of the rank 304, 306 from which the data is to be read may be based on other factors, thus allowing the identity of the rank 304, 306 to depend upon the particular memory location being read. For example, a previous error status of the particular data being read from the first rank 304 may suggest that the next read should occur from the second rank 306. In another implementation, if the data to be read is located within a known defective area, such as a row or column of one of the DRAMs 308 within the first rank 304, the next read within the same area may instead be directed to the second rank 306.

Thus, based on this previous decision, when the control circuit 302 receives a read command for the first rank 304 (operation 408), the control circuit 302 reads the requested data only from the selected rank 304, 306 (i.e., either the first rank 304 or the second rank 306) (operation 410).

Figure 5:
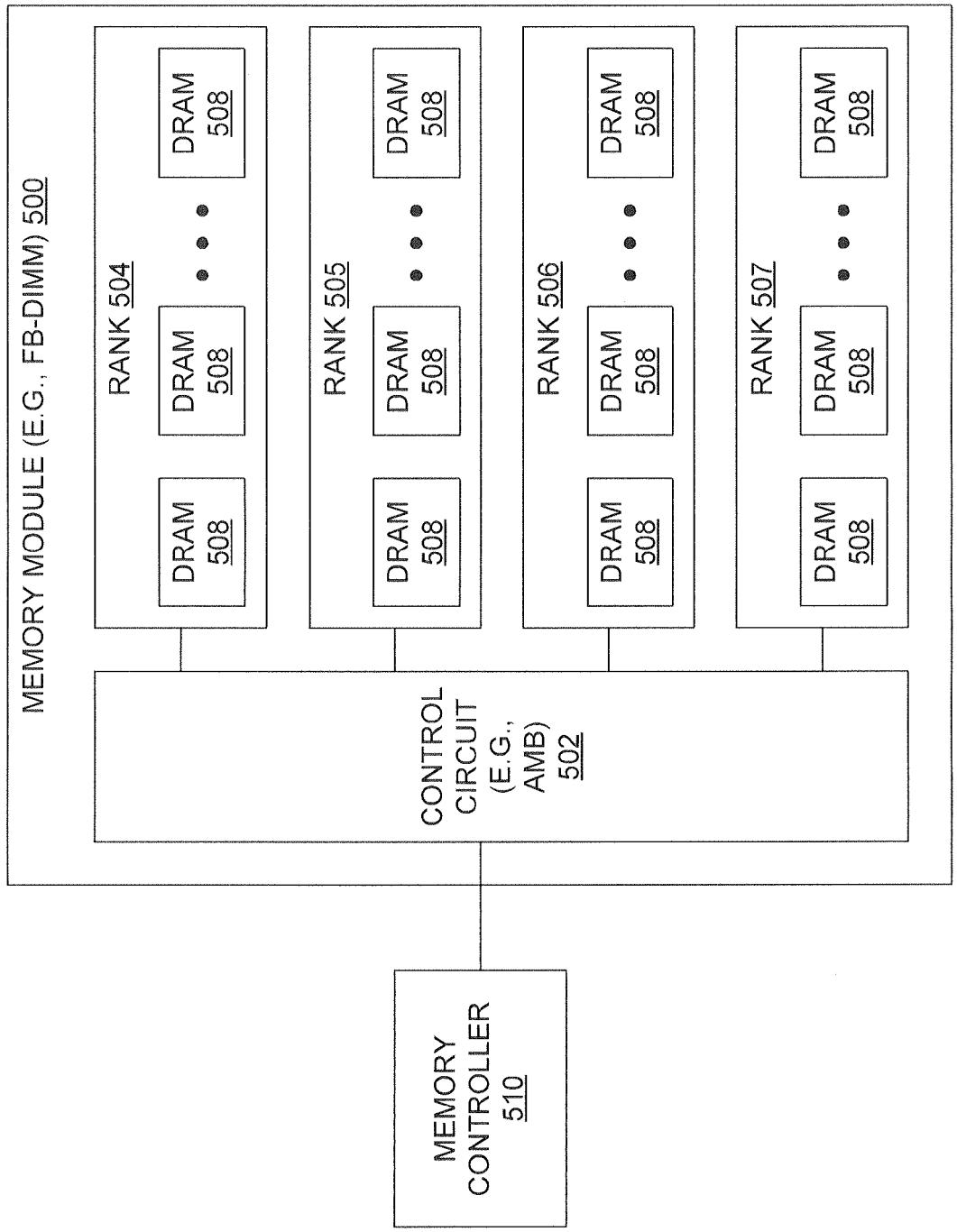
FIG. 5 is a block diagram of a memory module employing four memory ranks according to an embodiment of the invention.

Another memory module 500 employing a control circuit 502 coupled with each of four ranks 504, 505, 506, 507 is depicted by way of block diagram in FIG. 5. As before, the control circuit 502, which may be an AMB of an FB-DIMM, receives memory access instructions from a memory controller 510 and processes the commands to implement data mirroring within the memory module 500. Also, each of the ranks 504-507 includes multiple DRAMs 508, as described above. In one embodiment, the second rank 505 serves as a mirror for the first rank 504, while the fourth rank 507 is a mirror for the third rank 506.

Figure 6:
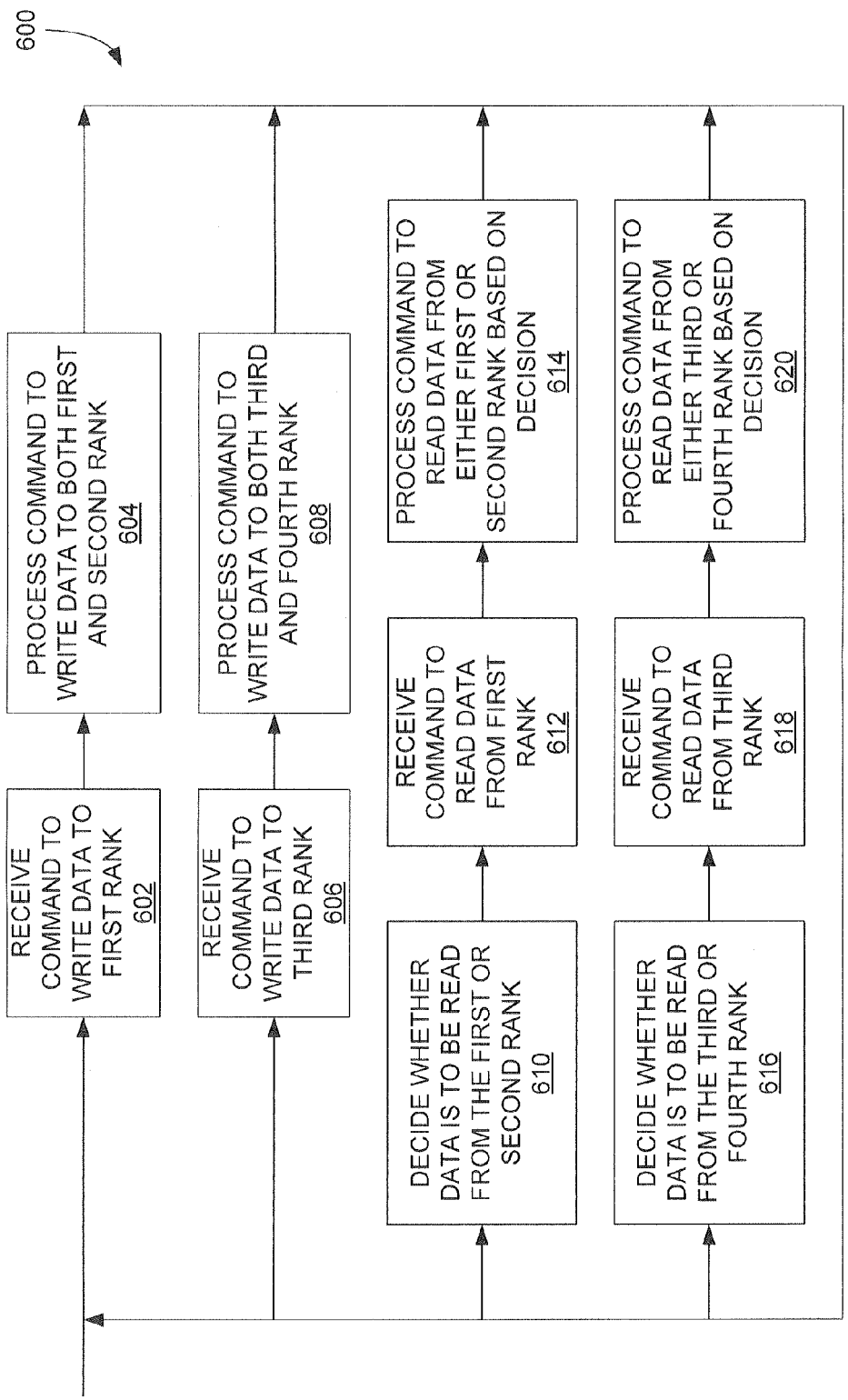
FIG. 6 is a flow diagram of a method for mirroring data in the memory module of FIG. 5, wherein two of the ranks serve as data mirrors for the two remaining ranks.

FIG. 6 provides a flow diagram of a method 600 for utilizing the two in-use ranks (i.e., the first rank 504 and the third rank 506) and their mirror ranks (i.e., the second rank 505 and the fourth rank 507, respectively). After receiving a write command from the memory controller 510 for writing data to the first rank 504 (operation 602), the control circuit 502 processes the write command to write the data to both the first rank 504 and the second rank 505 (operation 604). Similarly, after receiving a write command for writing data to the third rank 506 (operation 606), the control circuit 502 processes that command to write the data to both the third rank 506 and the fourth rank 507 (operation 608). In the embodiment of FIG. 5, each pair of write operations to the ranks 504-507 may be performed simultaneously to reduce or eliminate any overhead associated with mirroring the first rank 504 and the third rank.

After data has been written to the first two ranks 504, 505, a decision is made as to whether the data should thereafter be read from the original first rank 504 or the mirroring second rank 505 (operation 610). In one embodiment, the memory controller 510 determines whether data is to be read from the first rank 504 or the second rank 505. As discussed above, the memory controller 510 may use error detection and/or correction during the course of reading data from the first rank 504 to decide whether subsequent data should continue to be read from the first rank 504 or from the second rank 505. The memory controller 510 may then indicate by way of a signal to the control circuit 502 which of the first rank 504 or the second rank 505 should be read. In another implementation, another component of the electronic system in which the memory module 500 is incorporated may make this determination and indicate so to the control circuit 502. In another embodiment, the control circuit 502 may determine without input from the memory controller 510 which of the first rank 504 and the second rank 505 should be read. The control circuit 502 may make such a determination by way of error detection circuitry or other means. Based on this decision, when the control circuit 502 receives a read command for the first rank 504 (operation 612), the control circuit 502 reads the requested data only from the selected rank (i.e., either the first rank 504 or the second rank 505) (operation 614).

In a corresponding manner, when the memory controller 510 or another portion of the system reads the data previously written to the third rank 506 and the fourth rank 507, a decision is made beforehand as to whether the data is to be read from the originally addressed third rank 506 or the fourth rank 507 operating as the data mirror (operation 616). As discussed above, any of the memory controller 510, the control circuit 502, or another entity within the system employing the memory module 500 may make this determination, often by way of detecting and/or correcting data errors from previous read operations. When the control circuit 502 then receives a read command for the third rank 506 (operation 618), the control circuit 502 reads the requested data only from the selected rank (i.e., either the third rank 506 or the fourth rank 507) (operation 620).

Figure 7:
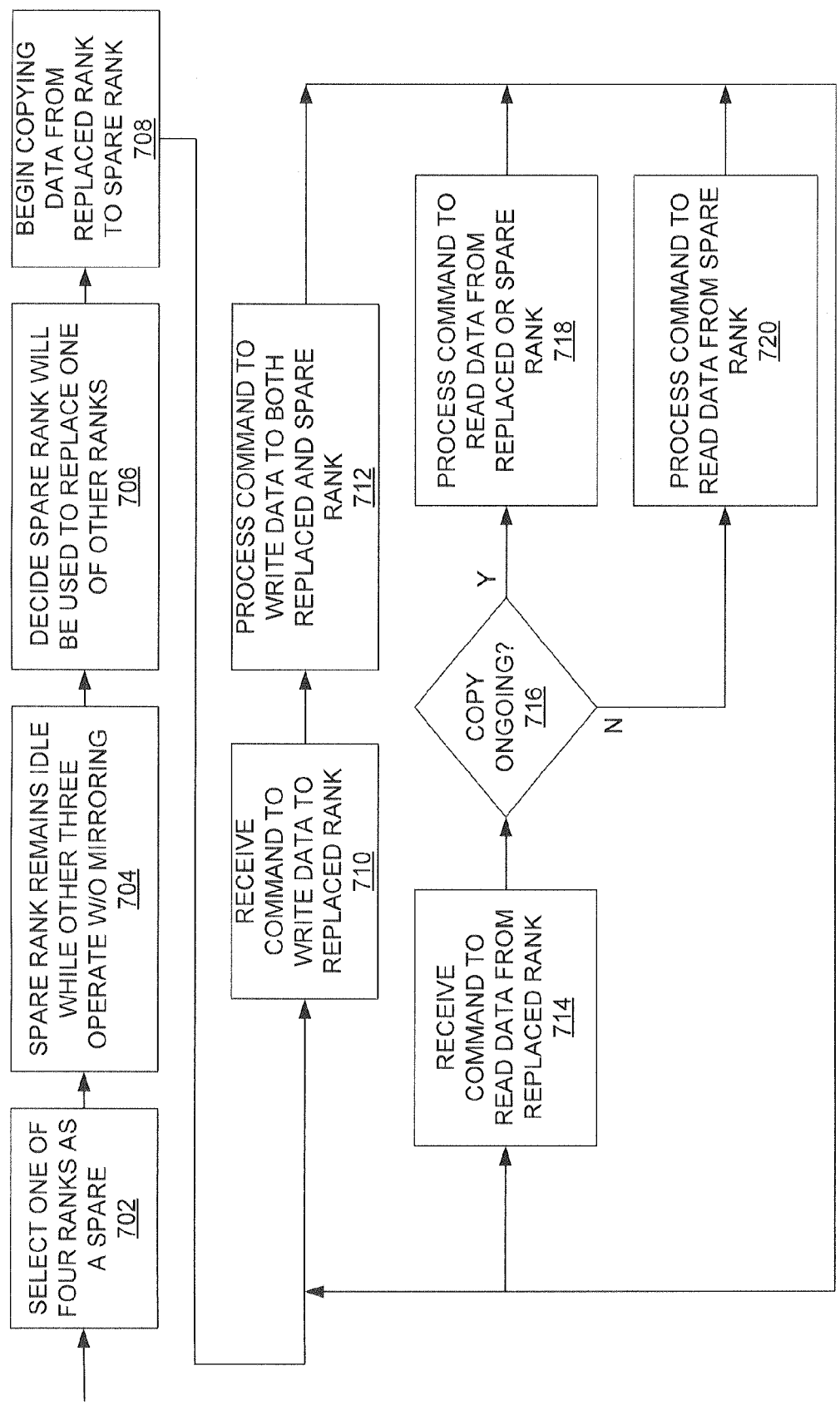
FIG. 7 is a flow diagram of a method for mirroring data in the memory module of FIG. 5, wherein one of the ranks serve as a data mirror for one of the three remaining ranks.

As described in the method 600 of FIG. 6, the four-rank memory module 500 is employed as two in-use ranks (i.e., the first rank 504 and the third rank 506) fully mirrored by two spare ranks (i.e., the second rank 505 and the fourth rank 507), resulting in a 50-percent reduction in the amount of usable memory capacity from the point of view of the memory controller 510. To partially alleviate the impact on capacity, FIG. 7 provides another method 700 in which only one of the four ranks 504-507 is potentially employed as a mirror for one of the three remaining ranks. As a result of this implementation, the usable memory capacity is only reduced 25 percent from the potential maximum while still providing significant mirroring capability.

As part of an initialization process of the system or platform in which the memory module 500 resides, one of the ranks 504-507 (e.g., the second rank 505) is selected as a spare (operation 702) and remains idle while the remaining three ranks (e.g., the first rank 504, the third rank 506 and the fourth rank 507) are written to and read from normally (operation 704). During normal memory access operations, a portion of the platform may decide that one of the three in-use ranks 504, 506, 507 should be replaced with the second rank 505 (operation 706). For example, the platform firmware (not shown in FIG. 5), by way of the memory controller 510, may decide that the first rank 504 should be replaced, possibly due to an error rate of the first rank 504 reaching a predetermined threshold. In another embodiment, the memory controller 510 or the control circuit 502 may make this determination.

Once the determination is made to replace the first rank 504, data within the first rank 504 may be copied over from the first rank 504 to the second rank 505 (operation 708). The responsibility for this copy operation may lie with the platform firmware, the memory controller 510, the control circuit 502, or another portion of the system. In one embodiment, an address counter (not shown in FIG. 5) may be used to track the progress of the copy operation. Also, the control circuit 502 receives write commands for writing data to the first rank 504 (operation 710) and processes the write commands to write the data to both the first rank 504 and the second rank 505 (operation 712).

The control circuit 502 may also receive read commands from the memory controller 510 to read data from the first rank 504 (operation 714). If the copy operation is still ongoing (operation 716), the control circuit 502 processes the read commands to read the data from either the first rank 504 or the second rank 505 (operation 718). In one embodiment, the read operations may be serviced by the first rank 504 since the copy operation has not completed. In another embodiment, whether the read operation is serviced by the first rank 504 or the second rank 505 may be determined by the progress of the copy operation. More specifically, if the copy operation is performed serially throughout the address space of the first rank 504 and the second rank 505, read operations involving memory locations that have already been copied may be serviced by the second rank 505, while the remaining locations may be read by way of the first rank 504. Other factors may also be considered when determining which of the ranks 504, 505 should be used for write operations. Furthermore, the responsibility for making this determination may lie with the control circuit 502, the memory controller 510, the platform firmware, or elsewhere.

Once the copy operation is completed (operation 716), the control circuit 502 then processes the read commands to read the requested data from the second rank 505 (operation 720), as the second rank 505 now serves as a replacement for the first rank 504. In addition, further write commands received by the control circuit 502 from the memory controller 510 may be processed so that either the second rank 505 is written, or both the first rank 504 and the second rank 505 are accessed.

In each of the previous embodiments, the control circuit 102, 302, 502 may be configured to allow the platform firmware to select whether rank-level data mirroring is implemented. For example, the memory module 300 of FIG. 3 may be configured such that mirroring the first rank 304 with the second rank 306 is selected, or, in the alternative, that both the first rank 304 and the second rank 306 are in-use ranks, thus doubling the memory capacity of the memory module 300 compared to the mirroring option. The memory module 500 of FIG. 5 may be similarly configured to allow zero, one, or two spare ranks, as discussed above.

Various embodiments of the invention, as described above, allow mirroring or replacement of data at a finer level of granularity than the use of one or more entire DIMMs or other memory modules for that purpose, thus facilitating more efficient use of the memory available. Also, mirroring at the rank level reduces or eliminates any loss of write bandwidth due to the ability to write multiple ranks simultaneously, unlike DIMM-level mirroring, which typically requires two separate write operations from the memory controller for each mirrored write command. Further, most of the logic circuitry required to implement the embodiments may likely be contained within a memory buffer IC or similar device coupling a memory controller with the memory devices, thus facilitating the implementation of the embodiments described herein. In the case of FB-DIMMs, which already employ an AMB device located on the memory module itself, much of the necessary circuitry may reside therein. Other memory module technologies may employ such circuitry as well.

While several embodiments of the invention have been discussed herein, other embodiments encompassed by the scope of the invention are possible. For example, while many embodiments as described above specifically involve the use of DRAM, other memory device technologies, such as SRAMs, may also benefit from application of various aspects of the invention as described herein. Also, application of the principles outlined herein may apply to many different types of electronic systems, such as general-purpose computer systems, network and communication servers, special-purpose electronic devices, and any other electronic system requiring a memory system. In addition, while particular embodiments involving DIMMs of two or four ranks have been described above, any memory module technology providing at least two memory ranks may be utilized advantageously according to the various aspects described herein. In another implementation, a rank of one memory module may mirror a rank of another memory module as long as the modules are located on the same memory bus, and thus may be written simultaneously. Further, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A system comprising:
   plural ranks each comprising a separate plurality of individually accessible memory locations that are accessed concurrently as a group, wherein a first of the plural ranks is designated as a spare rank that is initially idle; and
   control circuitry coupled to the plural ranks, the control circuitry being configured to:
   during operation of the system, decide which of multiple ones of the plural ranks to select for replacement;
   in response to selecting one of the plural ranks for replacements, copy data from the selected rank to the first rank to use the first rank as a mirror for the selected rank; and
   in response to receiving a write command for writing first data to the selected rank, process the write command to write the first data to both the first rank and the selected rank.

2. The system of claim 1,
   Wherein the plural ranks further comprise a second rank and a third rank, wherein the control circuitry is configured to select one of the second and third ranks for replacement.

3. The system of claim 1, wherein the spare rank is to remain idle until the decision to select one of the plural ranks for replacement.

4. The system of claim 1, wherein the first rank is selectively useable as a mirror rank for any one of multiple other ones of the plural ranks.

5. The system of claim 1, wherein the control circuitry is configured to select one of the plural ranks for replacement based on detecting an error condition associated with the selected rank.

6. The system of claim 1, wherein the control circuitry is configured to further:
   receive a read command to read second data from the selected rank;
   in response to determining that the copying of data from the selected rank to the first rank has not completed, service the read command from the selected rank; and
   in response to determining that the copying of data from the selected rank to the first rank has completed, service the read command from the first rank.

7. The system of claim 1, wherein the control circuitry is configured to further:
   receive a read command to read second data from the selected rank;
   determine whether the second data is located in a portion of the selected rank that has been copied to the first rank;
   in response to determining that the second data is located in the portion of the selected rank that has been copied to the first rank, service the read command from the first rank; and
   in response to determining that the second data is located in another portion of the selected rank that has not yet been copied to the first rank, service the read command from the selected rank.

8. The system of claim 1, wherein the control circuitry includes one or more of a control circuit in a memory module including the plural ranks, a memory controller, and a system platform.

9. A method of mirroring data by rank comprising:
   selecting one of plural ranks to use as a spare rank that is initially idle, wherein the plural ranks include multiple ranks in addition to the spare rank, and wherein each of the ranks includes a separate plurality of memory locations accessible concurrently as a group;
   deciding, by control circuitry, which of the multiple ranks to select for replacement;
   in response to selecting one of the multiple ranks for replacement, copying data from the selected rank to the spare rank to use the spare rank as a mirror for the selected rank; and
   in response to receiving a write command to write first data to the selected rank, processing the write command to write the first data to both the selected rank and the spare rank.

10. The method of claim 9, wherein the spare rank remains idle until the decision to select one of the multiple ranks for replacement.

11. The method of claim 9, wherein the spare rank is selectively useable as a mirror rank for any one of the multiple ranks.

12. The method of claim 9, further comprising selecting one of the multiple ranks for replacement based on detecting an error condition associated with the selected rank.

13. The method of claim 9, further comprising:
   receiving a read command to read second data from the selected rank;
   in response to determining that the copying of data from the selected rank to the spare rank has not completed, servicing the read command from the selected rank; and
   in response to determining that the copying of data from the selected rank to the space rank has completed, servicing the read command from the spare rank.

14. The method of claim 9, further comprising:
   receiving a read command to read second data from the selected rank;
   determining whether the second data is located in a portion of the selected rank that has been copied to the spare rank;
   in response to determining that the second data is located in the portion of the selected rank that has been copied to the spare rank, servicing the read command from the spare rank; and
   in response to determining that the second data is located in another portion of the selected rank that has not yet been copied to the spare rank, servicing the read command from the selected rank.

* * * * *

UNITED STATES PATENT AND TRADEMARK OFFICE
CERTIFICATE OF CORRECTION

PATENT NO. : 7,694,093 B2
APPLICATION NO. : 11/741487
DATED : April 6, 2010
INVENTOR(S) : Mark Shaw et al.

Page 1 of 1

It is certified that error appears in the above-identified patent and that said Letters Patent is hereby corrected as shown below:

In column 7, line 27, in Claim 2, delete "Wherein" and insert -- wherein --, therefor.

In column 8, line 42, in Claim 13, delete "space" and insert -- spare --, therefor.

Signed and Sealed this

Twentieth Day of July, 2010

David J. Kappos
*Director of the United States Patent and Trademark Office*